United States Patent [19]
Choi et al.

[11] Patent Number: 5,696,788
[45] Date of Patent: Dec. 9, 1997

[54] CIRCUIT FOR SEARCHING FAULT LOCATION IN A DEVICE HAVING A PLURALITY OF APPLICATION SPECIFIC INTEGRATED CIRCUITS

[75] Inventors: Sung Hyuk Choi; Sung Eun Jin; Doo Seop Eom; Je Soo Ko; Jong Hyun Lee, all of Daejeon, Rep. of Korea

[73] Assignees: Electronics and Telecommunications Research Institute, Daejeon; Korea Telecommunications Authority, Seoul, both of Rep. of Korea

[21] Appl. No.: 758,004

[22] Filed: Nov. 27, 1996

[30] Foreign Application Priority Data

Dec. 26, 1995 [KR] Rep. of Korea ............... 1995-56848

[51] Int. Cl.⁶ ............................................. G06F 11/60
[52] U.S. Cl. ............................................. 371/25.1
[58] Field of Search ..................... 371/25.1, 22.1, 371/22.2, 22.5, 22.6, 27; 370/60, 99

[56] References Cited

U.S. PATENT DOCUMENTS

| | | |
|---|---|---|
| 4,998,242 | 3/1991 | Upp . |
| 5,040,170 | 8/1991 | Upp et al. . |
| 5,185,736 | 2/1993 | Tyrrell et al. ............... 370/358 |

*Primary Examiner*—Vincent P. Canney
*Attorney, Agent, or Firm*—Antonelli, Terry, Stout & Kraus, LLP.

[57] ABSTRACT

The present invention relates to a circuit for searching a fault location in a device having a number of ASIC's, including a first BIP(Bit Interleaved Parity) generating unit, which is coupled to the input stage of the ASIC where a fault will be detected, for calculating and outputting BIP for the specific byte, which is one of overhead bytes that were already utilized, i.e., not in use in transmission line, during a certain period; a BIP extraction unit, which is in parallel connected with the first BIP generating unit, for extracting the same byte as said specific byte from overhead bytes, which are generated and inserted in the previous-stage ASIC, in order to compare with BIP inputted into the first BIP generating unit during a certain period; a BIP comparison unit for simply comparing the result outputted from the first BIP generating unit with the result outputted from the BIP extraction unit; a BIP accumulation unit for accumulating the results outputted by the BIP comparison unit; a BIP threshold interrupt processing unit for comparing the results accumulated by the BIP accumulation unit with the threshold value which is used as the reference for generating an interrupt, and then externally outputting the compared result; a second BIP generating unit, which is coupled to the output stage of the ASIC, for calculating and then outputting BIP for all the bytes within the transmission line(HBUS) during a certain period in order to inspect the signal of HBUS to the next-stage ASIC; and a BIP inserting unit for inserting the result generated from the second BIP generating unit into the specific byte location whithin said transmission line.

2 Claims, 7 Drawing Sheets

CIRCUIT FOR SEARCHING FAULT LOCATION IN A DEVICE HAVING A PLURALITY OF APPLICATION SPECIFIC INTEGRATED CIRCUITS

BACKGROUND OF THE INVENTION

1. Field of the Invention

The present invention relates to a circuit for searching a fault location in a device having a plurality of application specific integrated circuits (hereinafter referred to as "ASIC"), such as a multi-stage broadband switch, the fault being generated between the ASICs.

2. Description of Prior Art

As recently developed systems tend to have a large capacity/size, resulting in the integration, most of the system functions are accomplished by adopting an ASIC structure which can be installed as an element of the system.

In addition, as high-speed systems inevitably require that the transmission lines (connectors, cables, striplines, micro striplines, and the like) within a PCB (Printed Circuit Board) or between PCB's should be designed to perform high-speed processing, a serious system fault may be generated due to the fault in the connection between system function modules.

Particularly, with respect to the configuration of a multi-stage broadband switch having a Synchronous Digital Hierarchy(hereinafter referred to as "SDH"), taking into account the AU(Administration Unit)3/AU4 switching function of the T-S-T structure and the monitoring function by means of SDH overheader processing, a broadband access cross-connect system requires a plurality of ASIC elements, and organizes a complicated high-speed switch network.

Accordingly, it is absolutely necessary to identify fault location within the system and the reason why the fault was generated.

However, the existing circuit for searching a fault location is utilized only between network links or between network paths.

Even the method for searching faults generated in the same kinds of devices within a system can report only such faults as the inherent faults in the ASIC itself. Thus, the problem is that it is difficult to search a fault location and determine whether or not the fault is coming from the inside of the ASIC.

SUMMARY OF THE INVENTION

Accordingly, the present invention is devised to disentangle the above-mentioned problem, and its object is to provide a circuit for searching fault locations easily and accurately, in which the fault is generated in a device having a plurality of ASIC's such as a multi-stage broadband switch device.

In accordance with the present invention, a circuit for searching a fault location in a device having a plurality of Application Specific Integrated Circuits (ASIC), comprising:

a first BIP(Bit Interleaved Parity) generating means, which is coupled to the input stage of the ASIC where the fault will be detected, for calculating and outputting BIP(Bit Interleaved Parity) for a specific byte, which is one of the overheader bytes that were already utilized, i.e., not in use in transmission means during a certain period;

a BIP extraction means, which is in parallel connected with said first BIP generating means, for extracting the same byte as said specific byte from the overheader bytes, which are generated and inserted in the previous-stage ASIC, in order to compare with BIP inputted into said first BIP generating means during a certain period;

a BIP comparison means for simply comparing the result outputted from said first BIP generating means with the result outputted from said BIP extraction means;

a BIP accumulation means for accumulating the results outputted by said BIP comparison means;

a BIP threshold interrupt processing means for comparing the results accumulated by said BIP accumulation means with the threshold value which is used as the reference for generating an interrrupt, and then externally outputting the compared result;

a second BIP generating means, which is coupled to the output stage of the ASIC, for calculating and then outputting BIP for all the bytes within the transmission means(HBUS) during a certain period in order to inspect the signal of the transmission means(HBUS) to the next-stage ASIC; and a BIP inserting means for inserting the result generated from said second BIP generating means into a specific byte location within said transmission means.

In addition, said first BIP generating means, which is coupled to the input stage of the ASIC, calculates and then outputs BIP during a period of 8 Khz by using B1 byte of overhead bytes, which were already utilized, i.e., not in use in said transmission means, in order to search a fault location in the multi-stage broadband synchronous digital hierarchy cross-connect switch system having a plurality of ASICs connected via said transmission means(HBUS).

DETAILED DESCRIPTION OF THE PREFERRED EMBODIMENT

Referring to the accompanying drawings, the preferred embodiment of the present invention will now be described in detail.

Figure 1:
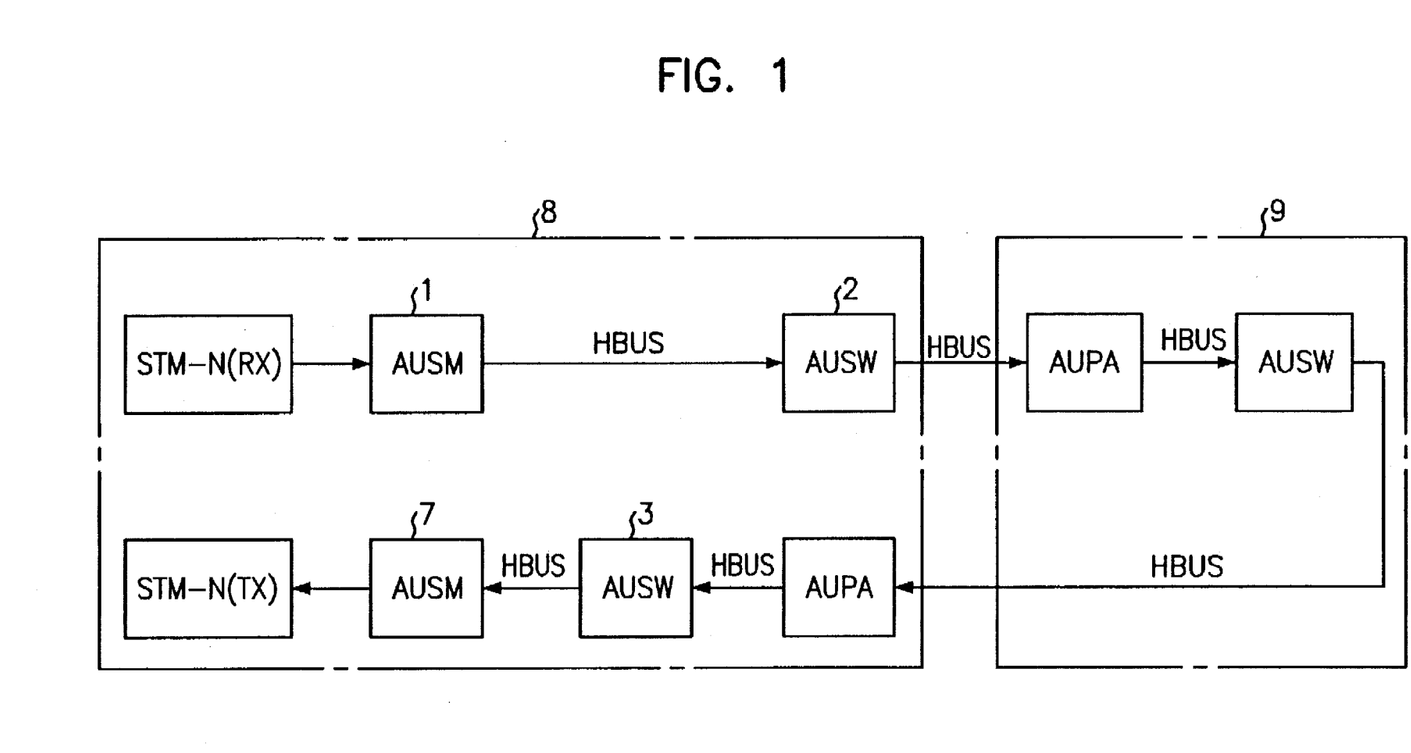
FIG. 1 is a schematic block diagram showing an example of a multi-stage broadband synchronous digital hierarchy cross-connect switch system having a plurality of ASIC chips in accordance with the present invention.

FIG. 1 is a schematic block diagram showing an example of a multi-stage broadband SDH cross-connect switch system having a plurality of ASIC chips in accordance with the present invention, wherein 1 represents AUSM ASIC fulfilling a pointer processing and an overheader monitoring function by the AU unit, 2 represents AUSW ASIC performing the front stage time switch of a multi-stage broadband switch, and 3 denotes AUSW ASIC performing a phase array function which is between two HBUS's, 7 denotes AUSM ASIC, and 8 and 9 indicate system boards, respectively.

As shown in FIG. 1, HBUS is connected between all adjacent ASIC's, and is also connected between all adjacent boards.

Suppose that the BIP(Bit Interleaved Parity) generation function and the BIP comparison function are realized in the ASIC input stage, and on the contrary, that the BIP generating function and BIP inserting function are realized in the ASIC output stage.

In this case, whenever a fault is generated within a system, it is easy to determine whether or not the fault is generated within the ASIC.

Subsequently, in case it is determined that the fault is generated outside the ASIC, it is easy to identify in which HBUS the fault was generated.

Now that HBUS is connected between all adjacent boards, any errors generated between each adjacent board will be easily detectable.

Figure 2:
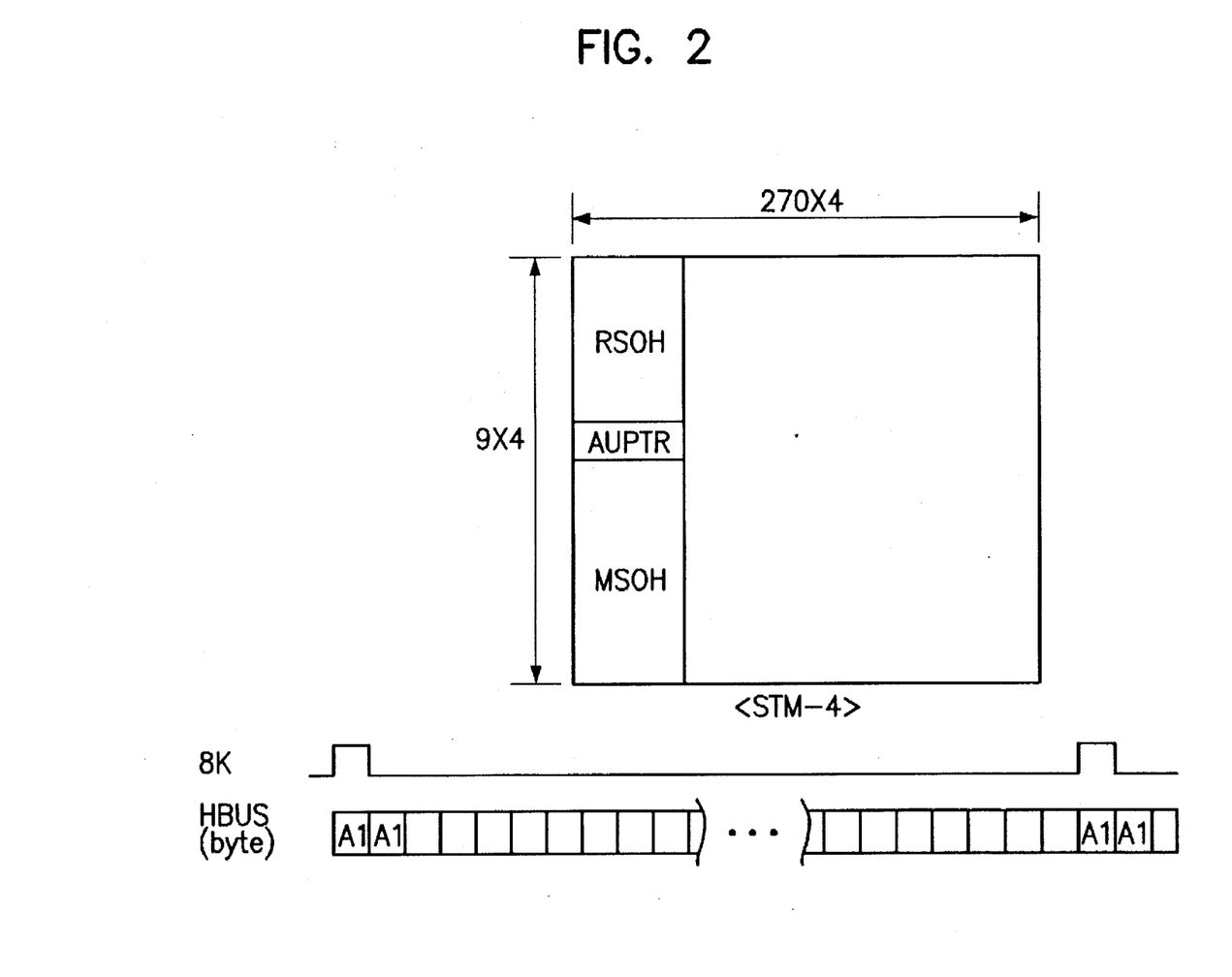
FIG. 2 is a configuration diagram of the connection signal frame between ASIC's of FIG. 1.

With regard to the transmission means(HBUS) connected between ASIC's and between boards, as shown in FIG. 2, the number of HBUS having a bit rate 77.78 Mbps, which is 8 bit parallel data obtained by dividing STM-4 frame by eight, is 9720 during the frame clock 8 KHz.

In addition, said HBUS is configured such that 12 A1 bytes and 12 A2 bytes are sequenced.

The operation of the present invention is described as follows:

a B1 byte, one of overhead bytes of SDH, is assigned to a storage area in which a parity byte is inserted with the help of BIP circuit. The B1 byte is interpreted by the overhead monitoring ASIC before it is applied into the front stage of the time switch based switching ASIC.

Also, the B1 byte is not used until it is transmitted to the overhead processing ASIC by way of the space and rear time based switching ASIC and then connected to the network.

HBUS, which is designed to process 600Mbps 8-bit data, is responsible for extracting and comparing BIP in the front stage of ASIC by generating BIP from each data of HBUS for every frame, and is responsible for inserting BIP corresponding to each frame such that BIP is compared in the rear stage of the ASIC.

The circuit for searching a fault location in accordance with the present invention can monitor transmission errors in HBUS which is used as input/output between ASIC's. The present invention can detect a fault location and its cause since the ASIC itself has a fault monitoring block.

In addition, the present invention does not require an additional circuit which is used for generating extra data in order to search a fault location since some data, which are not utilized in HBUS to be monitored, can be used.

Moreover, the present invention has less redundancy since it uses one byte per HBUS. Also, an additional circuit for searching fault locations is embodied easily.

One preferred embodiment in accordance with the present invention will now be described in detail.

Figure 3:
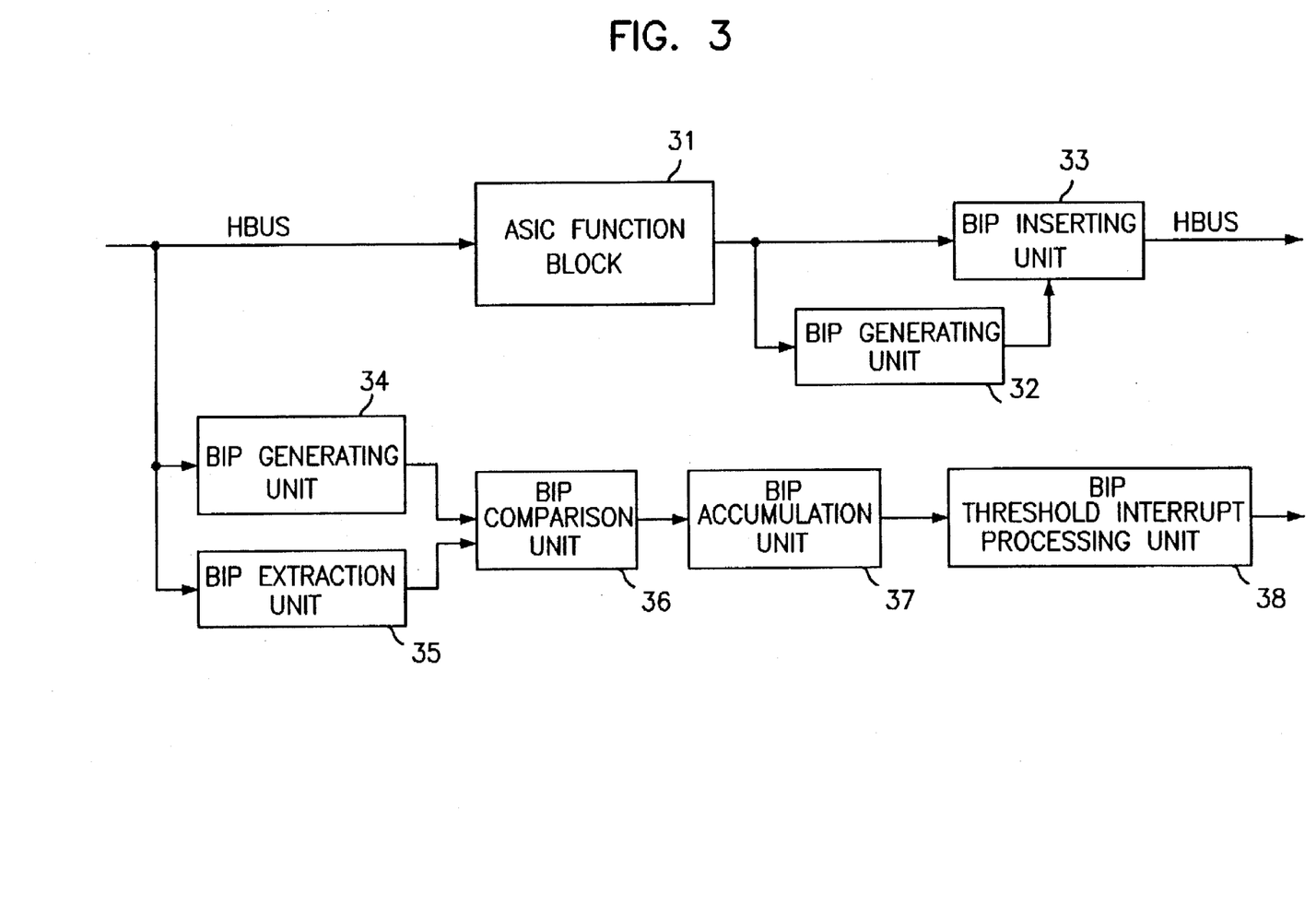
FIG. 3 is a block diagram showing a circuit for searching a fault location between ASIC's in accordance with an embodiment of the present invention.

FIG. 3 is a block diagram showing a circuit for searching fault location between ASIC's in accordance with the present invention, which is applied to the multi-stage broadband SDH cross-connect switch system shown in FIG. 1.

In FIG. 3, 31 represents each unique ASIC function block, 32 and 34 represent BIP generating units. 33 represents a BIP inserting unit, 35 represents a BIP extraction unit, 36 represents a BIP comparison unit, 37 represents a BIP accumulation unit, and 38 represents a BIP threshold interrupt processing unit.

Referring to FIG. 4 through FIG. 8, the operation of each unit composing a circuit in accordance with the present invention will now be described in detail.

It should be noted that each unit has been already known as a prior art.

Figure 4:
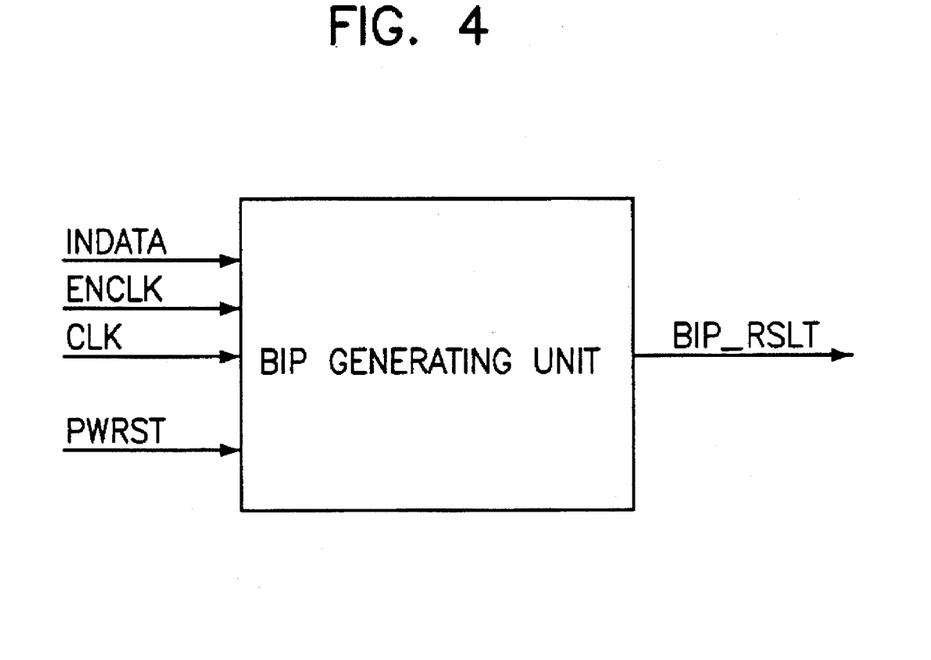
FIG. 4 is a schematic diagram showing the operation of BIP generating unit of FIG. 3.

The BIP generating unit of FIG. 4 is responsible for calculating BIP during a period of 8 Khz. In addition, INDATA means input data, that is, HBUS which is used as a transmission means.

ENCLK, which is enabled at all data except B1 byte, indicates which data is to be calculated for BIP. CLK represents a clock corresponding to INDATA, and BIP_RSLT represents the result of BIP calculation.

Figure 5:
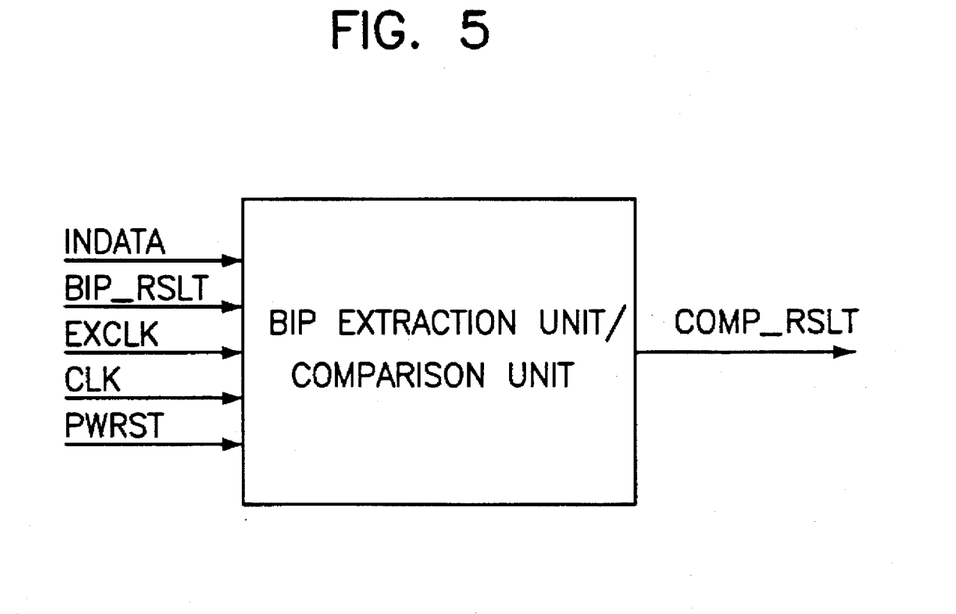
FIG. 5 is a schematic diagram showing the operation of BIP extraction/comparison units of FIG. 3.

The BIP extraction unit of FIG. 5 extracts B1 byte that has been generated and inserted in the front stage of the ASIC in order to compare said B1 byte with BIP value inputted into said BIP generating unit during one period, and then the BIP comparision unit of FIG. 5 compares values transmitted from said BIP generating unit and BIP extraction unit.

In FIG. 5, INDATA indicates input data, HBUS which is used as a transmission means. BIP-RSLT denotes the output of the BIP generating unit. EXCLK denotes an extraction enable clock assigned to B1 byte, which is used to extract data having BIP calculation result inserted by the front stage of the ASIC. CLK represents a clock assigned to INDATA.

Figure 6:
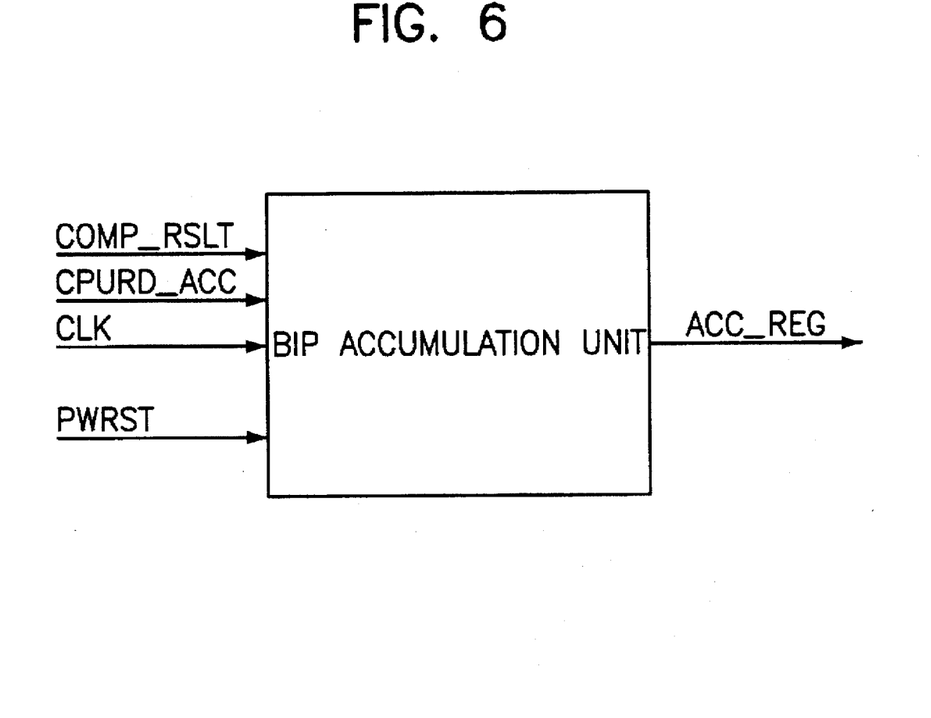
FIG. 6 is a schematic diagram showing the operation of BIP accumulation unit of FIG. 3.

Output COMP-RSLT is used to generate a counter enable signal so that the BIP accumulation unit of FIG. 6 can accumulate BIP calculation result in case said BIP calculation result is incorrect.

Figure 7:
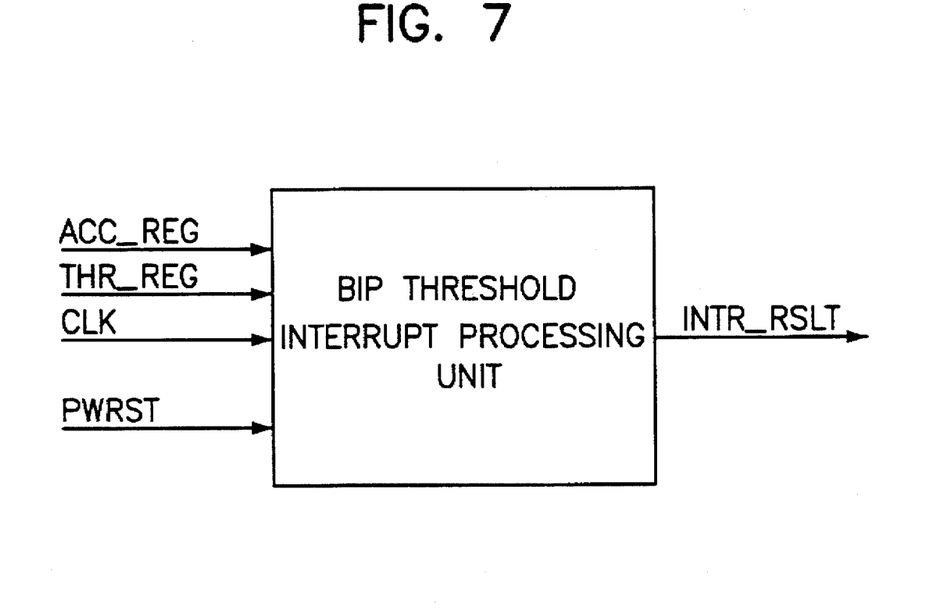
FIG. 7 is a schematic diagram showing the operation of BIP threshold interrupt processing unit of FIG. 3.

The BIP accumulation unit of FIG. 6 accumulates detection result signals by BIP accumulator. The BIP threshold interrupt processing unit of FIG. 7 compares accumulated values with threshold values by INTR-ENABLE which is a generation control signal, and then sends the comparison results to an external CPU so that the signal on HBUS, transmitted from the previous ASIC to the current ASIC, can be checked as to whether or not the signal has a transmission error.

Figure 8:
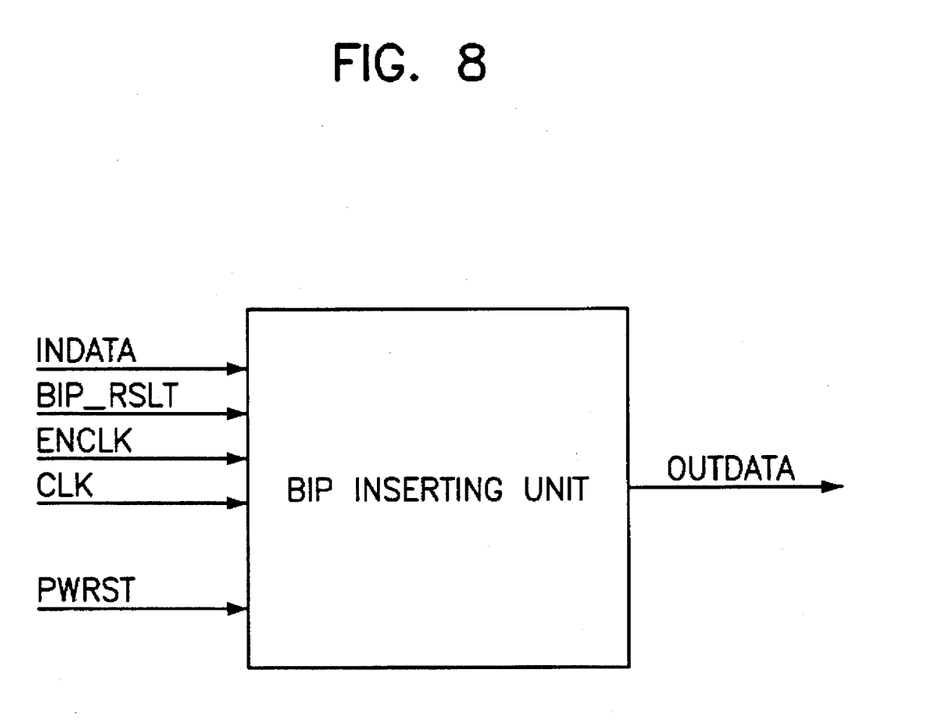
FIG. 8 is a schematic diagram showing the operation of BIP inserting unit of FIG. 3.

The BIP inserting unit of FIG. 8 inserts BIP_RSLT, BIP calculation result by CLK into the specific location within input data INDATA that is indicated by ENCLK.

The ASIC function block 31 of FIG. 3 represents an ASIC that is responsible for the unique functions of AUSM, AUSM and AUPA shown in FIG. 1.

Said BIP generating unit 34, BIP extraction unit 35 and BIP comparison unit 36 are inserted in the front stage of the ASIC as shown in FIG. 3, and said BIP generating unit 32 and BIP inserting unit 33 are installed on the rear stage of the ASIC.

Figure 9:
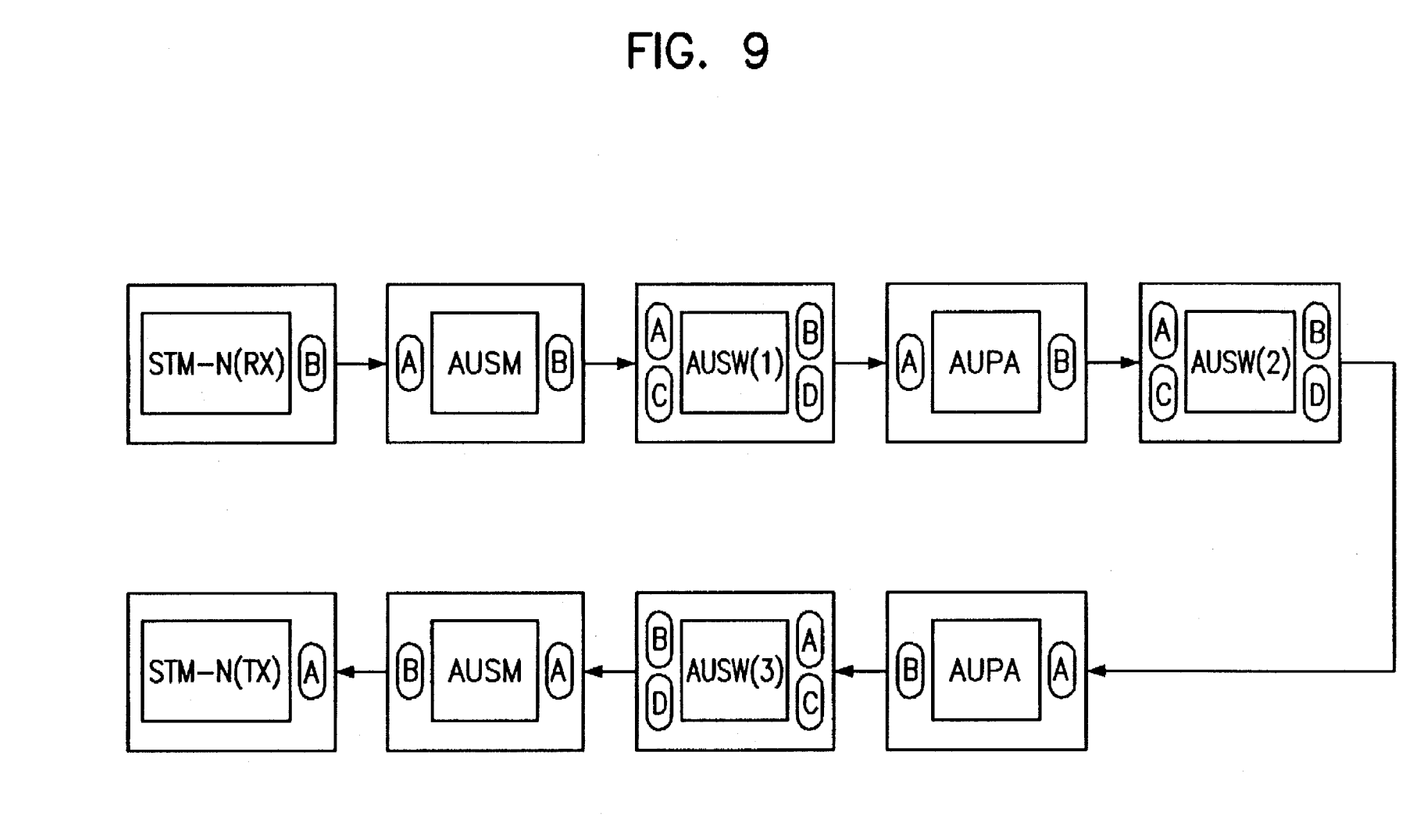
FIG. 9 is a diagram showing a search point of an ASIC fault location in the multi-stage broadband synchronous digital hierarchy cross-connect switch system of FIG. 1 in accordance with the present invention.

FIG. 9 illustrates the ASIC fault search point of the multi-stage broadband SDH cross-connect switch system, wherein the fault search point ASIC between ASIC's and the fault search point within the switch ASIC are depicted, respectively.

Search point "A", which is located on the data input part of all ASIC's, represents the transmission fault search point between ASICs and thus, the transmission errors from the ASIC output part (search point "B") of the front stage to the current search point "A" can be detected.

In view of the entire switch including AUSW (1), AUSW (2) and AUSW (3), the connection row-column fault generated in the multi-stage switch function T-S-T can be detected by using "C" point of AUSW (1) and "D" point of AUSW (3).

In addition, while the transmission faults between ASIC's are not actually generated, it can be determined whether or not the switch function is unduly operated due to only the wrong connection between switches by using "D" point of AUSW (3).

Furthermore, by using the combination of "C" and "D" points of AUSW (1), "C" and "D" points of AUSW (2), "C" and "D" points of AUSW (3), or "C" and "D" points of said AUSW (1), (2) and (3), respectively, the transmission errors on the routing path between each ASIC, the transmission errors on the routing path between said AUSW (1) and said ASIC (2), and between said AUSW (2) and said AUSW (3), and the transmission errors on the routing path among said AUSW (1), (2) and (3) can be detected.

As mentioned above, the present invention can easily detect the transmission errors of HBUS, which is the input/output means between ASIC's.

Also, the present invention can detect a fault location and its cause easily and efficiently since the ASIC is equipped with a self fault monitoring block.

The present invention does not need an additional circuit for generating extra data which are used for searching a fault location because of using data which are not used in HBUS to be monitored.

In addition, the present invention has less redundancy since it uses one byte per HBUS, and the additional circuit used for searching fault locations can be made with a simple circuit.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description. All changes which come within the meaning and range of equivalency of the claims are therefore intended to be embraced therein.

What is claimed is:

1. A circuit for searching a fault location in a device having a plurality of Application Specific Integrated Circuits (ASIC), comprising:

a first BIP(Bit Interleaved Parity) generating means, which is coupled to the input stage of the ASIC where a fault will be detected, for calculating and outputting BIP(Bit Interleaved Parity) for the specific byte, which is one of overhead bytes that were already utilized, i.e., not in use in transmission means, during a certain period;

a BIP extraction means, which is in parallel connected with said first BIP generating means, for extracting the same byte as said specific byte from overhead bytes, which are generated and inserted in the previous-stage ASIC, in order to compare with BIP inputted into said first BIP generating means during a certain period;

a BIP comparison means for simply comparing the result outputted from said first BIP generating means with the result outputted from said BIP extraction means;

a BIP accumulation means for accumulating the results outputted by said BIP comparison means;

a BIP threshold interrupt processing means for comparing the results accumulated by said BIP accumulation means with the threshold value which is used as the reference for generating an interrrupt, and then externally outputting the compared result;

a second BIP generating means, which is coupled to the output stage of the ASIC, for calculating and then outputting BIP for all the bytes within the transmission means(HBUS) during a certain period in order to inspect the signal of the transmission means(HBUS) to the next-stage ASIC; and a BIP inserting means for inserting the result generated from said second BIP generating means into a specific byte location within said transmission means.

2. A circuit for searching fault location in a device having a plurality of Application Specific Integrated Circuits(ASIC) as claimed in claim 1, wherein said first BIP generating means, which is coupled to the input stage of the ASIC, calculates and then outputs BIP during a period of 8 Khz by using B1 byte of overhead bytes, which were already utilized, i.e., not in use in said transmission means in order to search a fault location in the multi-stage broadband synchronous digital hierarchy cross-connect switch system having a plurality of ASICs connected via said transmission means(HBUS).

* * * * *